United States Patent [19]
Rando et al.

[11] 3,732,365
[45] May 8, 1973

[54] SELECTIVE BLANKING OF VIDEO DISPLAY

[75] Inventors: Frederick D. Rando, Cherry Hill; William P. Rogers, Collingswood, both of N.J.

[73] Assignee: Ultronic Systems Corporation, Moorestown, N.J.

[22] Filed: July 1, 1971

[21] Appl. No.: 158,677

Related U.S. Application Data

[62] Division of Ser. No. 756,916, Sept. 3, 1968, Pat. No. 3,624,516.

[52] U.S. Cl..........178/6.8, 178/DIG. 6, 178/DIG. 23
[51] Int. Cl................................................H04n 5/24
[58] Field of Search.......................178/6.8, DIG. 23, 178/DIG. 6, 5.1, 5.6

[56] References Cited

UNITED STATES PATENTS

| | | | |
|---|---|---|---|
| 3,586,767 | 6/1971 | Morchand | 178/5.6 |
| 3,256,386 | 6/1966 | Morchand | 178/5.6 |
| 3,456,071 | 7/1969 | Jackson et al. | 178/DIG. 23 |

*Primary Examiner*—Howard W. Britton
*Attorney*—Norman J. O'Malley et al.

[57] ABSTRACT

Alphanumeric information supplied in the form of electrical signals from a plurality of input sources can be fed to a central control unit and rearranged therein for subsequent transmission to one or more video display monitors, each monitor employing a separate cathode ray tube. Each source can be assigned a preselected portion of the display area on each tube whereby each tube can display the information from each of the sources in its preassigned area in the form of a complete display of all of the sources apparently simultaneously.

Our invention is adapted for use in systems as described above. It employs circuitry located partially in the common unit and partially in each monitor for the selective blanking of one or more display areas in one or more tubes. In other words, information from some of the sources may be displayed by any one monitor while at the same time information from others of the sources can be blanked out on the same monitor. To this end, control pulses identified with corresponding input sources are sequentially introduced at the unit for transmission to all of the monitors. Circuitry at each monitor can be selectively enabled to detect such control pulses and to utilize the detected pulses for selective blanking.

4 Claims, 5 Drawing Figures

INVENTORS
FREDERIC D. RANDO
WILLIAM P. ROGERS

BY

*Robert T. Orner*

ATTORNEY

SELECTIVE BLANKING OF VIDEO DISPLAY

CROSS-REFERENCE TO RELATED APPLICATIONS

The present application is a divisional application of a copending patent application of Frederic D. Rando and William P. Rogers, Ser. No. 756,916, filed Sept. 3, 1968, now U.S. Pat. No. 3,624,516, entitled "Selective Blanking of Video Display."

BACKGROUND OF THE INVENTION

Patent application Ser. No. 657,664, filed Aug. 1, 1967 and assigned to the assignee of the present application, and now U.S. Pat. No. 3,643,252 discloses a system for receiving electrical signals from three sources, i.e., the New York Stock Exchange, the American Stock Exchange and a News Service. The first two sources supply transactions information, while the last named source supplies financial news.

A central control unit receives these signals, arranges same in proper time sequence for sequential display, generates synchronization pulses and transmits the pulses and signals, properly interleaved, to a plurality of monitors for selective display.

A typical full display at a monitor presents transactions of the New York Stock Exchange on a top portion of the cathode ray tube; American Stock Exchange transactions on the mid-portion of the tube; and financial news information on the remaining lower portion of the tube.

The monitors are leased rather than purchased by the end user, who is charged a fee for each source that is to be displayed. When an end user wishes to pay for only one, or possibly two, of the sources and does not want to pay for the other source or sources, it is necessary to blank out the unwanted sources in the display on his monitor. Since information from all sources is fed to all monitors for display, it is necessary to provide means for separately and selectively blanking each monitor.

SUMMARY OF THE INVENTION

In our invention, separate control impulses generated in the control unit are introduced into the video stream prior to transmission. The timing of the impulses is such that an impulse precedes transmission of source information. Thus, one impulse precedes New York Stock Exchange data, a second impulse precedes American Stock Exchange data and a third impulse precedes News Service data.

Each impulse must be so timed as to avoid creation of intersymbol interference. To this end, each impulse can be superimposed upon the synchronization pulses initiating the display of the corresponding source at the monitor. Each monitor is provided with equipment for detecting the presence of the control impulses. This equipment can be manually adjusted to respond to any one or more of these pulses or to respond to none. In the latter case, the monitor displays all sources. In the former case, the impulses are detected and can be used thereafter to blank out the appropriate portions of the display, for example, by a gate to interrupt the flow of video signals in the monitor for a selected interval or intervals. If desired, the detected impulses can be used for other control purposes in addition to or instead of blanking.

DETAILED DESCRIPTION OF PREFERRED EMBODIMENTS

Figure 1:
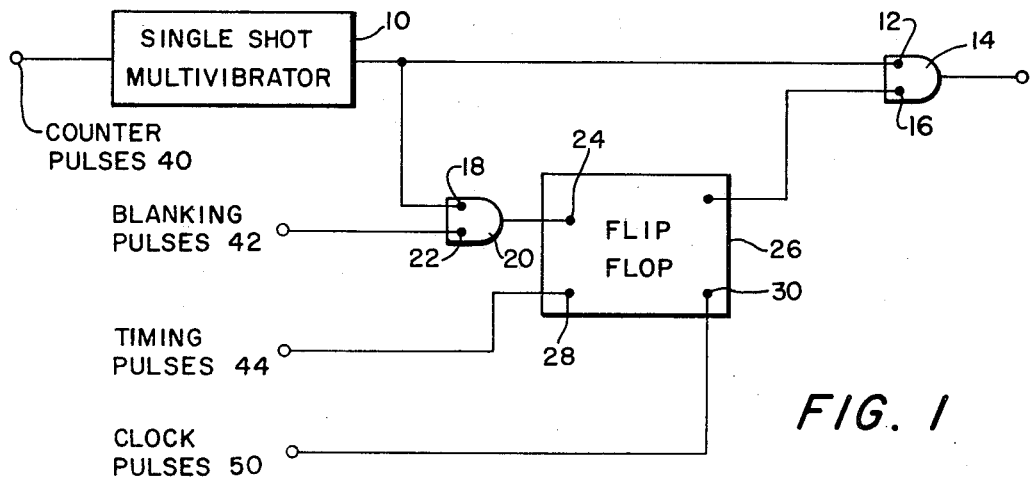
FIG. 1 is a block diagram of circuitry used in our invention as installed in a central control unit.
Figure 2:
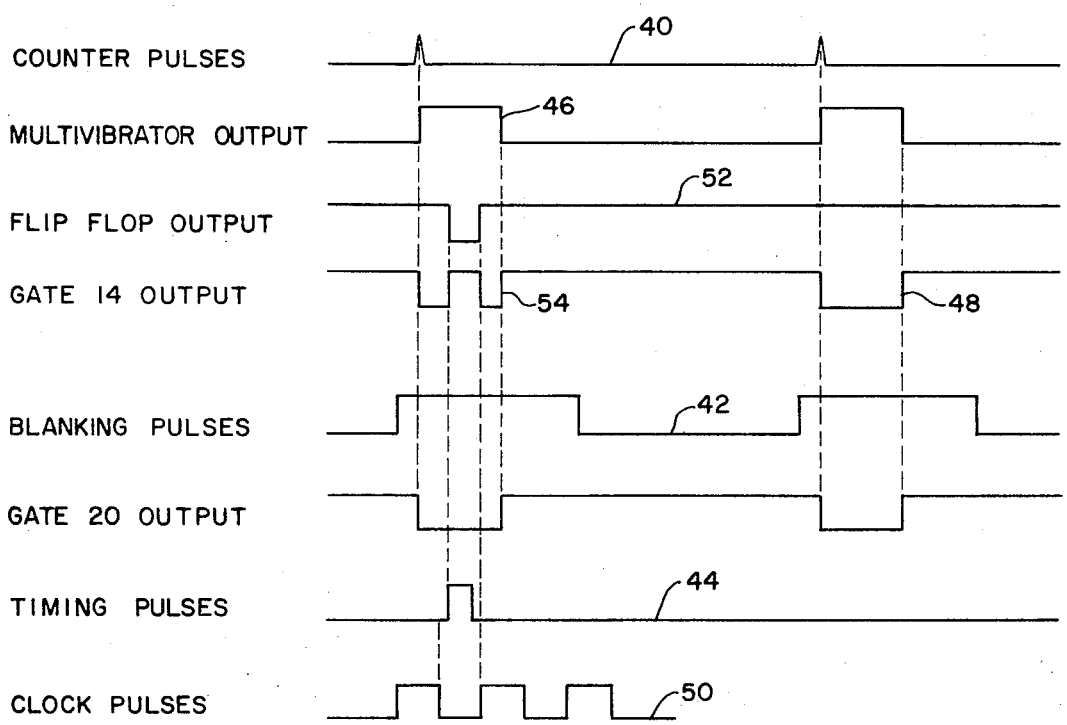
FIG. 2 illustrates wave forms used in the circuitry of FIG. 1.
Figure 3:
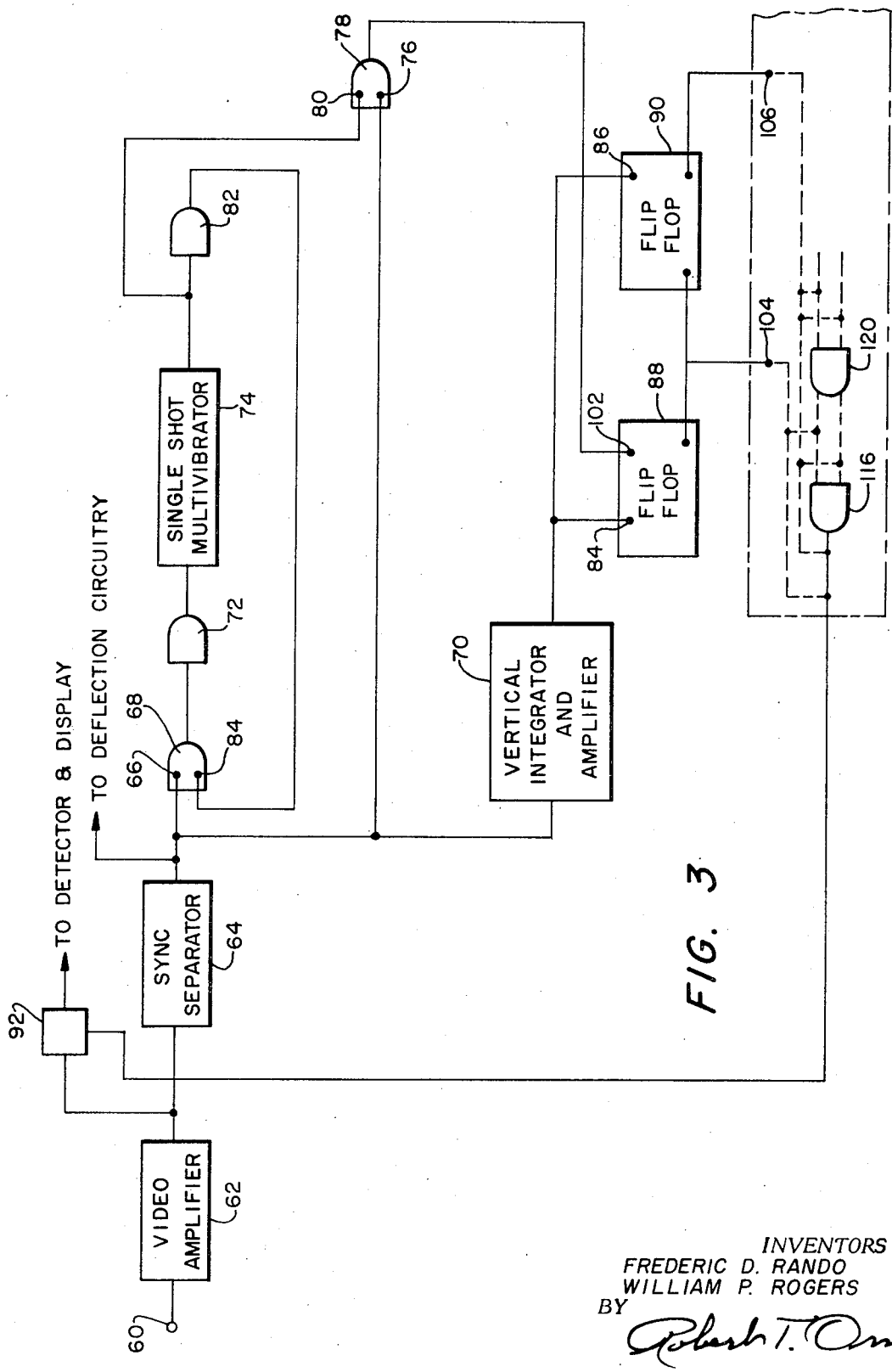
FIG. 3 is a block diagram of circuitry used in our invention as installed in a monitor.

In the description which follows, the term "high" input or output means that the potential at the input or output is relatively high and positive while the term "low" input or output means that the potential at the input or output is relatively low and positive. All gates shown are of the NAND type wherein the output is low only when all inputs are high and the output is high when one or more inputs are low. All inverters shown convert high inputs to low outputs and vice versa. For ease of illustration, conventional ground connections have not been shown in the drawings.

The system described in U.S. Pat. No. 3,643,252, referred to above, employs television receiver monitors of conventional type using a 60 Hertz field frequency with a 260 line field. The horizontal and vertical synchronizing signals conform to United States standards for this field frequency and number of field lines.

Referring now to FIGS. 1 through 4, the output of a single shot multivibrator 10 is connected to the first input 12 of a gate 14 and is also connected to a first input 18 of another gate 20. The output of gate 20 is connected to input 24 of flip-flop 26. The output of flip-flop 26 is connected to a second input 16 of gate 14. Counter pulses 40 are supplied to the input of the multivibrator. Control or blanking pulses 42 are supplied to a second input 22 of gate 20. Timing pulses 44 are supplied to input 28 of the flip-flop, while clock pulses 50 are supplied to an input 30 of the flip-flop. All input pulses are unidirectional and have positive polarity.

The counter pulses are produced at horizontal line scan rate by a counter (not shown). Multivibrator 10, upon the reception of a counter pulse 40, produces a single positive going rectangular pulse 46 which is a conventional horizontal line scan pulse. When pulse 46 arrives at input 12 of gate 14 and, at the same time, the output of flip-flop 26 is high, a rectangular pulse 48 unaltered in wave form, but reversed in polarity, passes through gate 14.

However, when a control pulse 42 and a timing pulse 44 are present simultaneously at the inputs of the flip-flop, the flip-flop output is switched from high to low for the duration of the timing pulse 44 and is then switched from low to high by the clock pulses 50 which are used to maintain the flip-flop output high. Note that timing pulses 44 are always produced during intervals between clock pulses.

When the flip-flop output is switched from high to low and back again, thus producing a flip-flop output impulse 52, at the time that the rectangular pulse 48 from the multivibrator is passing through gate 14, the impulse 52 is superimposed upon a portion of the rectangular pulse, thus producing a composite pulse 54 appearing at the output of gate 14.

As a result, each time a counter pulse is supplied to the multivibrator, a pulse is produced at the output of gate 14. This pulse is either pulse 48 or pulse 54. In either event, this pulse is supplied to one or more monitors as a horizontal synchronizing pulse. The presence of impulse 52 can be detected by circuitry at the monitor for use in selective blanking of portions of the display. When the horizontal synchronizing pulse has only the rectangular shape, circuitry at the monitor does not function and no selective blanking can occur. The control pulses 42 and timing pulses 44 are so timed as to produce three impulses 52 per field, each impulse preceding the data from the source with which it is associated.

Other circuitry, not shown, produces the video information signals, and the synchronizing pulses (including the vertical synchronizing pulses which are produced by other circuitry) are combined with the video and transmitted in conventional manner by closed circuit to the various monitors.

The transmitted signal is received at terminal 60 at each monitor and passes through video amplifier 62. The video information signals pass therefrom through a normally open gate 92 and a video detector to the picture tube for display. When the gate 92 is closed, it blocks signal flow and prevents display. The synchronization signals are separated from the video in synchronization separator 64. The synchronization signals are then supplied to input 66 of gate 68, the input of a vertical integrator and amplifier 70 and to input 76 of gate 78. The output of gage 68 is connected via inverter 72 to the input of a single shot multivibrator 74. The output of multivibrator 74 is connected to input 80 of gate 78 and is connected through inverter 82 to input 84 of gate 68. The output of integrator 70 is connected to inputs 84 and 86 of flip-flops 88 and 90. The output of gate 78 is connected to input 102 of flip-flop 88.

One or more of output terminals 104 and 106 of flip-flops 88 and 90 can be connected directly or via logic to be described to electronic switch 92. Switch 92 is connected to terminal 60 for selective grounding thereof as described below.

The horizontal synchronizing pulses with or without impulses 52, i.e., pulses 48 or 54, are supplied to input 66 of gate 68. The output signal 94 from inverter 82 is supplied to input 84 of gate 68. The output signal 96 from gate 68 is normally high. However, upon the arrival of a pulse 48, signal 96 goes low. Signal 98 at the output of inverter 72 goes high, triggering multivibrator 74 to produce a positive going pulse 100 of positive polarity. This pulse, inverted by inverter 82 is applied to gate 68 whereby signal 96 returns to its high state.

Pulses 100 and 48 are supplied to gate 78 which derives therefrom a high signal 108.

Upon the arrival of a pulse 54, however, the presence of impulse 52 therein varies the time of generation of the positive going pulse 100 at the multivibrator, whereby the output signal 108 at gate 78 goes low during that portion of the period of pulse 54 which is in time coincidence with the presence of the positive going pulse 100.

These low portions of signal 108 represent control impulses and are used as described below to generate pulses for closing gate 92 to produce the selective blanking action at the face of the picture tube of the monitor under consideration. To this end, signals 108 are supplied to the input 102 of flip-flop 88. Flip-flops 88 and 90 constitute a two stage counter which is advanced one count whenever signal 108 goes low.

The vertical synchronizing pulses yielded at separator 64 are integrated and amplified to provide low going impulses 110 at the beginning of each field. These pulses are supplied to inputs 84 and 86 of flip-flops 88 and 90 to reset both their initial states. This is necessary since the counter can count to four, and there are only three blanking pulses per field. Unless the counter is reset, the circuitry will function improperly.

Figure 4A:
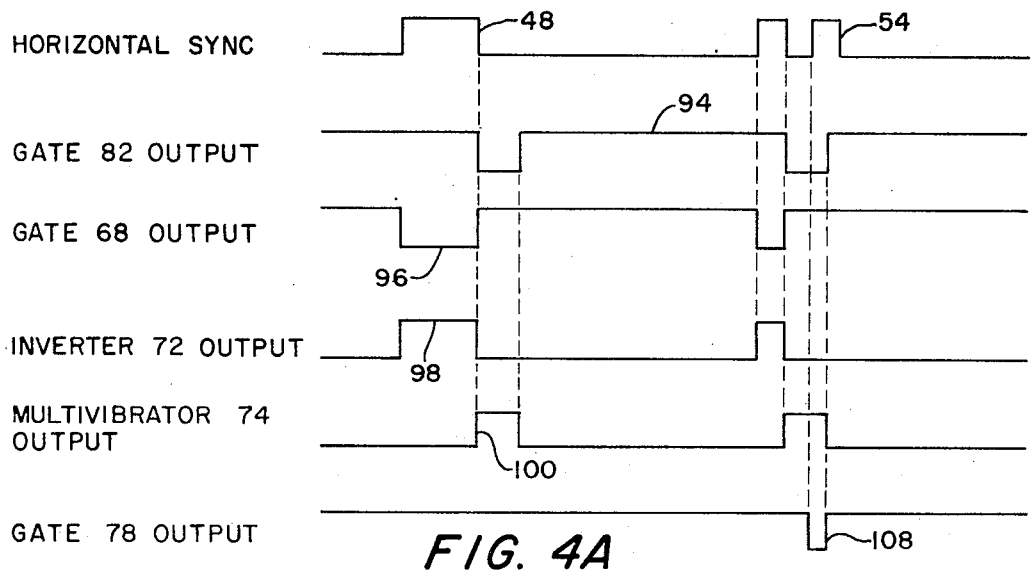
FIGS. 4a and 4b illustrate wave forms used in the circuitry of FIG. 3.
Figure 4B:
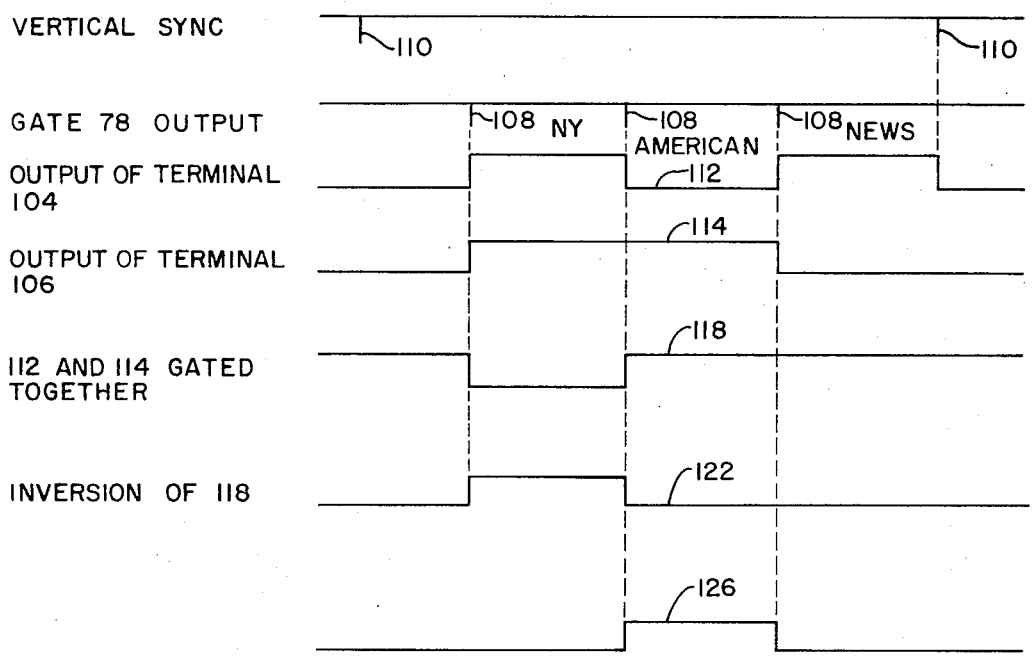

The resulting signals at output terminals 104 and 106 are shown at signals 112 and 114, respectively, on FIG. 4B. Note that signal 112 is high during the New York Exchange portion of the display and during the News Service portion of the display and is low at all other times, while the signal 114 is high during the New York Exchange and American Exchange portions of the display and is otherwise low.

Thus, if signal 112 is supplied to gate 92, the gate is closed during the period when transactions of the New York Exchange and the News Service data are to be displayed whereby only the American Exchange transactions are displayed. Similarly if signal 114 is supplied to gate 92, only the news would be displayed.

By gating these signals together in gate 116, signal 118 can be produced. This signal can be inverted by inverter 120 to produce signal 120 for supply to gate 92, thereby enabling display of the American Exchange transactions and the News Service while cutting off the display of the New York Exchange transactions. Signal 118 can be supplied directly to the gate 92 to provide for the sole display of the New York Exchange transactions. Signal 126 can be easily derived to provide for the sole display of the American Exchange transactions.

Thus, depending upon the particular blanking conditions required, gate 116 and inverter 120 shown in box 128 may or may not be used and the circuit connections shown in phantom can be varied as required.

The control impulses can be inserted in any synchronizing pulse, vertical or horizontal, and can be used at the monitor for purposes other than blanking, for example, sounding an alarm or flashing a light for special news announcements and the like.

While we described our invention with particular reference to preferred embodiments, our protection is to be limited only by the claims which follow.

What is claimed is:

1. In a video display system wherein intermixed synchronizing pulses and video signals flow from a central unit to a plurality of display monitors, each of which contains its own display tube, said signals being supplied from a plurality of sources, whereby, in the absence of selective blanking, each tube displays information from said plurality of sources in a corresponding plurality of vertically displaced display areas in a single display field:

a first device located at said central unit for combining a blanking impulse with that synchronization pulse in the synchronizing pulse train which immediately precedes the information for display from any selected source whereby a composite pulse train is supplied to all monitors, said device including a. first means to produce said synchronizing pulse train, b. second means to produce control pulses a preselected intervals, each such interval having at least a portion thereof in time coincidence with a portion of the period in which a pulse is produced in the synchronizing train, c. third means to produce a blanking impulse whenever a timing signal is received thereby during the time of a control pulse produced by the second means, and d. fourth means to combine said pulse train with said impulse to produce said composite pulse train; and a second device disposed at each monitor and responsive to said composite train to detect the presence of said blanking impulse and thereafter to blank the display on the corresponding tube of the information from the selected source, said second device being manually enabled and disabled, said second device including a. first means for deriving control signals from the detected impulses, and b. second means responsive to said control signals to blank the display by interrupting the flow of video information to the tube during the blanking step.

2. In a video display system wherein intermixed synchronizing pulses and video signals flow from a central unit to a plurality of display monitors, said video signals being supplied sequentially from a plurality of sources, apparatus for blanking individual monitors from displaying the video signals from selected ones of said sources comprising:

means located at said central unit for generating a composite pulse train, said pulse train including a plurality of synchronizing pulses separated by a predetermined time interval, each synchronizing pulse having a predetermined time duration and selected ones of said synchronizing pulses including a timing pulse within the predetermined time duration of said selected ones of said synchronizing pulses, said timing pulse indicating the start of video signals from one of the plurality of sources and being represented by a change in signal level within said selected ones of said synchronizing pulses;

an input terminal associated with each of said plurality of display monitors;

means coupled to said input terminal and including a control terminal for passing the video signals from said central unit for further processing in the absence of a blanking signal at said control terminal; and means having an input connection coupled to said input terminal and an output connection coupled to said control terminal for generating selective blanking signals in response to the timing pulses of said composite pulse train.

3. A video display system according to claim 2 wherein said means for passing the video signals is a normally open gate having a control element coupled to said means for generating selective blanking pulses and being operative in response to blanking pulses to close said normally open gate.

4. A video display system according to claim 2 wherein said means for generating selected blanking pulses comprises:

first gating means having a first input connection coupled to said input terminal, a second input connection and an output connection, and being operative in response to corresponding signal levels at its first and second input connections to change the output signal level at its output connection from a first level to a second level;

multivibrator means having an input connection coupled to the output connection of said first gating means and an output connection coupled to the second input connection of said first gating means and being operative in response to a change in the first gating output signal from the second level to the first level to produce a pulse at its output connection;

second gating means having a first input connection connected to the output connection of said multivibrator means and a second input connection connected to the first input connection of said first gating means and an output connection and being operative in response to the composite pulse train signal and the multivibrator output signal being at said second signal level to generate an output signal at the output connection of said gating means whereby the second gating means only produces an output signal when there is a change in signal level within said synchronizing signal;

means coupled to the output connection of said second gating means for generating a plurality of blanking pulses in response to an output signal from said second gating means; and means for selectively connecting certain ones of said blanking pulses to the control terminal of said means for passing the video signals whereby video signals are selectively blanked from the associated display when blanking pulses are present at the control terminal of said means for passing.

* * * * *